United States Patent [19]

Nevarez et al.

[11] Patent Number: 4,998,115

[45] Date of Patent: Mar. 5, 1991

[54] METHOD AND APPARATUS FOR PRIMING AN INK JET PEN

[75] Inventors: Ruben Nevarez, San Diego; Robert W. Beauchamp, Leucadia, both of Calif.

[73] Assignee: Hewlett-Packard Company, Palo Alto, Calif.

[21] Appl. No.: 248,254

[22] Filed: Sep. 20, 1988

Related U.S. Application Data

[63] Continuation of Ser. No. 24,646, Mar. 11, 1987, abandoned.

[51] Int. Cl.⁵ ........................ G01D 15/16; B41J 2/165

[52] U.S. Cl. ................................ 346/1.1; 346/140 R

[58] Field of Search .................... 346/1.1, 140, 75, 25; 400/126

[56] References Cited

U.S. PATENT DOCUMENTS

| | | | |
|---|---|---|---|
| 3,747,120 | 7/1973 | Stemme | 346/75 |
| 4,170,016 | 10/1979 | Geil | 346/140 R |
| 4,306,245 | 12/1981 | Kasugayama et al. | 346/140 PD |
| 4,479,136 | 10/1984 | Lewis et al. | 346/140 R |
| 4,500,895 | 2/1985 | Buck et al. | 346/140 R |
| 4,517,577 | 5/1985 | Miranda | 346/140 R |
| 4,558,326 | 12/1985 | Kimura et al. | 346/1.1 |
| 4,573,819 | 3/1986 | Herrnring | 401/151 |
| 4,714,937 | 12/1987 | Kaplinsky | 346/140 PD |

*Primary Examiner*—Mark J. Reinhart
*Attorney, Agent, or Firm*—Eugene H. Valet

[57] ABSTRACT

A method and apparatus for priming a thermal ink jet pen is disclosed. Using an ink reservoir fabricated of a foam material, forced air pressure applied to the foam causes ink therein to flow through the foam and into the printhead. A holder for a rubber air bladder operates in conjunction with a pen cartridge holder whereby an air hole in the reservoir container is aligned with the bladder. Manually pushing the cartridge against a spring results in a squeezing of the bladder, causing air to exert a compression-like pressure directly on the foam reservoir.

12 Claims, 5 Drawing Sheets

METHOD AND APPARATUS FOR PRIMING AN INK JET PEN

This application is a continuation of application Ser. No. 07/024,646 filed Mar. 11, 1987, now abandoned.

BACKGROUND OF THE INVENTION

1. Field of the Invention

The present invention generally relates to ink jet printer technology and, more precisely, to a method and apparatus for priming a thermal ink jet pen.

2. Description of the Related Art

In general, thermal ink jet technology involves using thermal excitation to boil ink and ejecting droplets of ink through tiny orifices in an ink jet pen printhead nozzle plate in order to form patterns of dots on paper. A general description of ink jet technology can be found, for example, in the *Hewlett Packard Journal,* Volume 36, Number 5, May 1985, incorporated herein by reference.

One of the inherent difficulties of ink jet printing is the necessity to ready a pen for operation. For example, when attaching a new pen to a printer or after a period of non-usage, ink may not be present at the orifices.

FIG. 2 depicts a typical disposable pen cartridge 2, having an integral ink storage reservoir compartment 4, and a printhead 6, having a nozzle plate 8. In order to have acceptable printing occur on first demand, it is desirable to prime the printhead, i.e. to fill an ink holding chamber generally located between the plate 8 and a thin-film substrate which includes a resistor/heater structure of the printhead 6. A disposable ink jet head is described in U.S. Pat. No. 4,500,895 (Buck et al.), assigned to the common assignee herein.

Several systems have been developed to accomplish ink jet priming. MIRANDA ET AL., U.S. Pat. No. 4,517,577, use a pressurized ink supply and flow ink through a manifold which is adjacent to scoop lines leading to reservoirs which are subjacent each orifice. A valve mechanism allows ink to flow through the manifold to the scoops during a priming cycle.

GEIL, U.S. Pat. No. 4,170,016, shows a manual, plunger pump for pressurizing a remote ink source, using a relief valve to ensure that the pen is not overpressurized during priming.

HERRNRING, U.S. Pat. No. 4,573,819, shows a permanently collapsible primary reservoir using an electrical motor to pump ink from the primary reservoir to a secondary reservoir requiring a charging valve connection between the two reservoirs.

Such prior systems are complicated and cumbersome and, more particularly, are not amenable to more modern systems where, for example, the pen and self-contained ink reservoir(s) may be of a disposable type as shown in FIG. 2.

SUMMARY OF THE INVENTION

In a basic aspect, the present invention presents a method for priming an ink jet pen having an ink reservoir connected to a ink holding chamber located between a heater substrate and a nozzle plate having at least one orifice for ejecting excited ink droplets, comprising applying a force on said ink reservoir such that ink is forced from said reservoir into said holding means.

In another basic aspect, the present invention presents a priming apparatus for an ink jet device including compressible ink supplying means for containing a supply of ink, ejecting means having at least one orifice for ejecting droplets of ink, agitating means for imparting excitation to said ink, and ink holding means, located approximately between said agitating means and said ejecting means and connected to said ink supplying means, for transferring excited ink to said orifice, comprising means for imparting a force to said ink supplying means and means for coupling said ink supplying means to said force imparting means, such that said force imparting means can force ink from said supplying means to said holding means by imparting a compression-like force on said supplying means. p Other objects, features and advantages of the present invention will become apparent upon consideration of the following detailed description and the accompanying drawings, in which like reference designations represent like features throughout the FIGURES.

The drawings referred to in this description should be understood as not being drawn to scale except if specifically noted. Moreover, the drawings are intended to illustrate only one aspect of an ink jet printer apparatus.

DETAILED DESCRIPTION OF THE INVENTION

Figure 2:
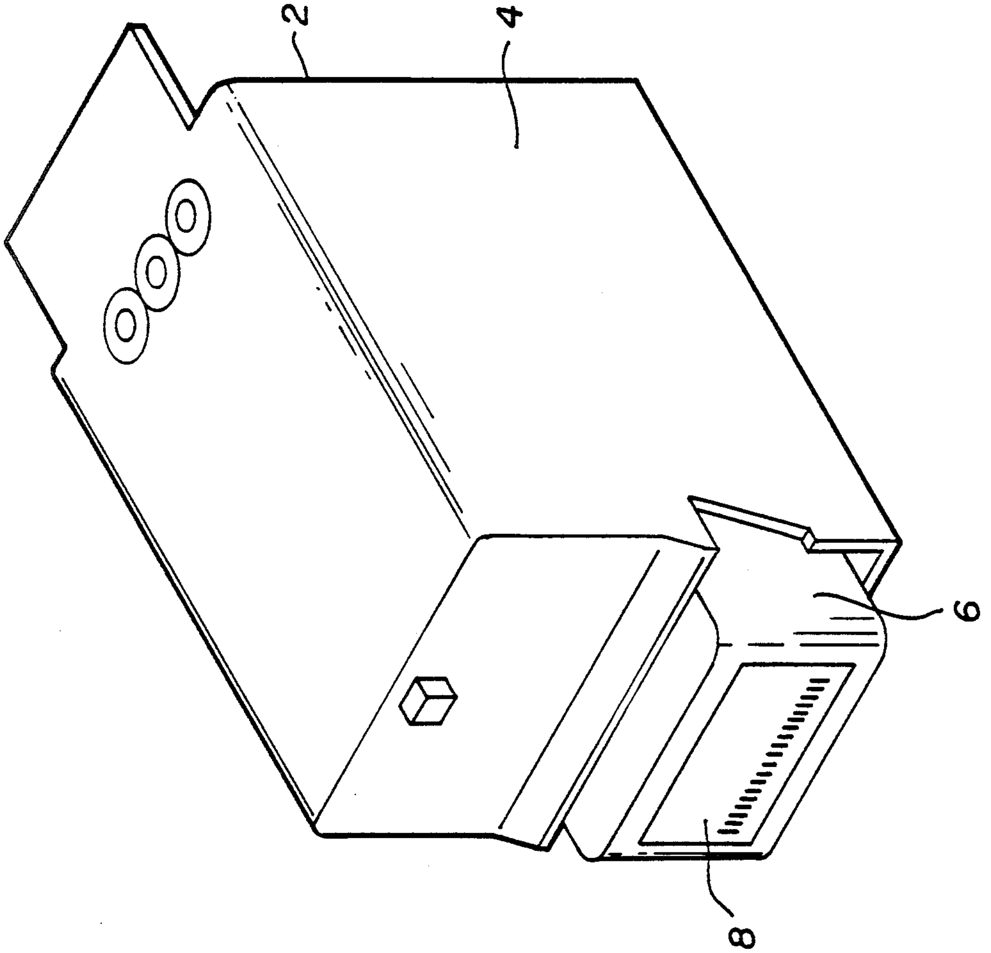
FIG 2 (PRIOR ART)
FIG. 2 (prior art) is a perspective view of a thermal ink jet pen as may be primed in accordance with the present invention as shown in FIG. 1.

Reference is made now in detail to a specific embodiment of the present invention, which illustrates the best mode presently contemplated by the inventor(s) for practicing the invention. Alternative embodiments are also briefly described as applicable. The present invention can be used to prime an ink jet cartridge 2, such as shown in FIG. 2, which is disposable, viz., the cartridge 2 can be removed from a carrier (not shown) which is designed to hold the cartridge 2 in a working relationship to a print media, e.g. paper. With respect to the present invention, the ink reservoir within the cartridge reservoir chamber 4 is chosen to be a porous foam which allows the storage of a large percentage of ink per volume and which is susceptible to the influence of compression-like forces imparted directly to the foam.

Figure 1A:
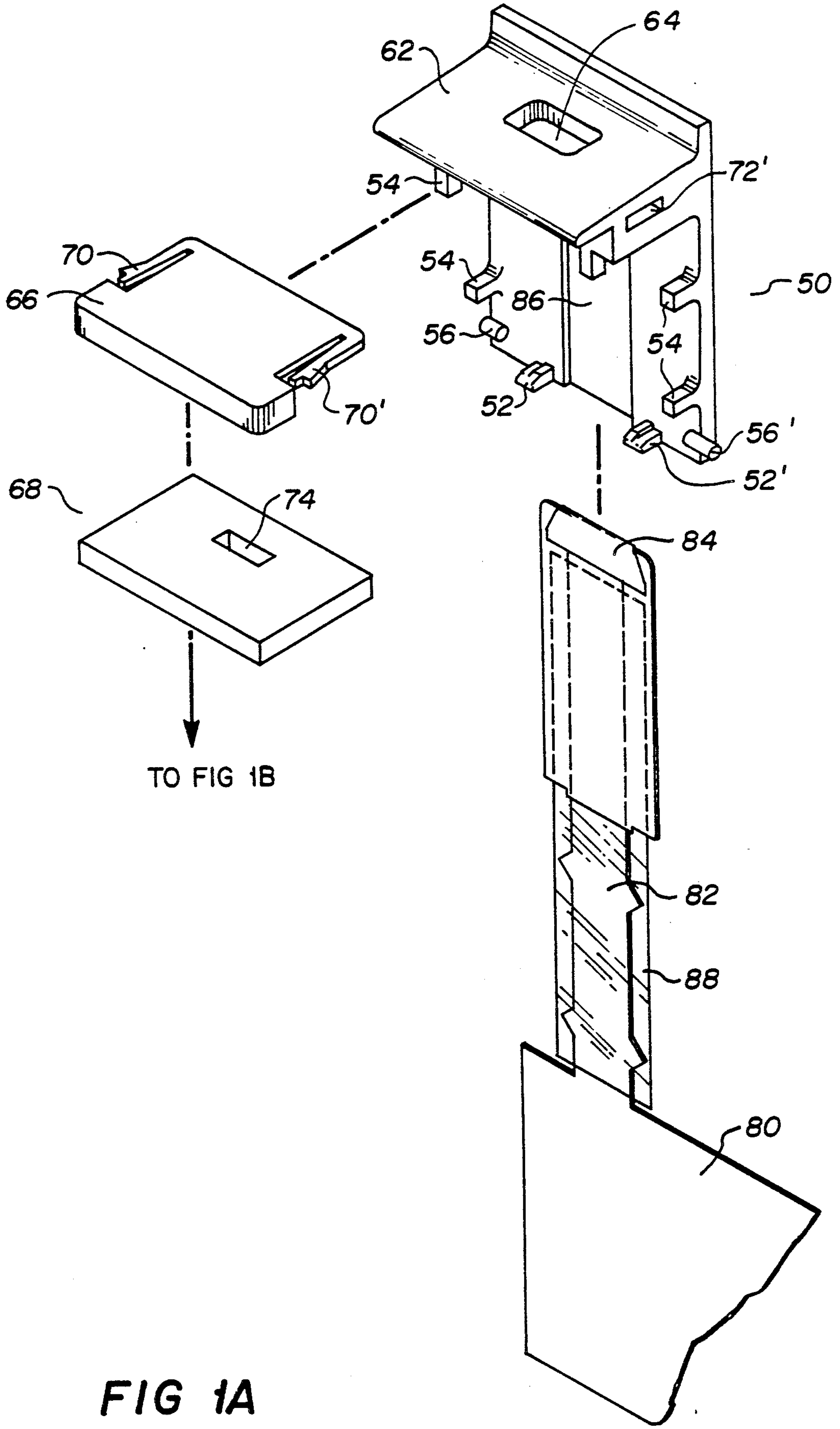
FIG. 1 is an exploded view schematic of an embodiment of the present invention.
Figure 1B:
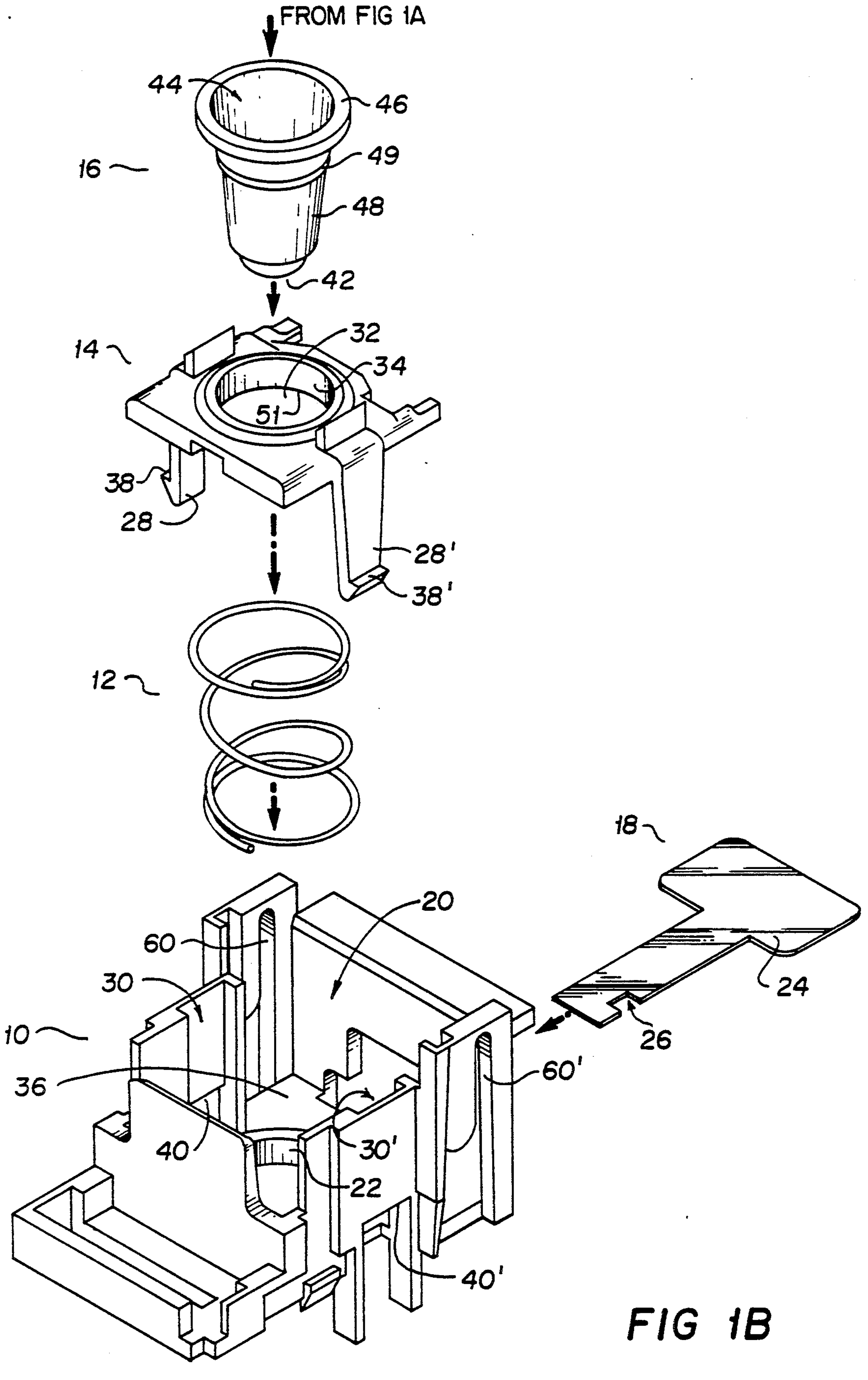

An exploded depiction of a preferred embodiment of the present invention is shown in FIG. 1. A housing 10 is shown which has a particular shape adapted to be held in a fixed position in a particular commercial embodiment of a color printer. As such, a description of the particular shape of the housing is not critical to an understanding of the invention; the shape, as well as the materials used to construct the housing 10, can be tailored to the individual need. The basic concept is that the housing 10 be able to contain a force imparting mechanism and that it be adapted in shape to allow that mechanism to couple to the ink reservoir of the pen cartridge 2.

Four components, labelled 12–18, make up the mechanism for imparting a force to the reservoir in the pen 2: a compression spring 12, a spring and bladder holder 14, a flexible, e.g. rubber, bladder 16, and a flexible housing floor 18.

The holder 14 is mounted within a central chamber 20 in the housing 10. In the present embodiment, the spring 12 is held centrally within the housing chamber 20 by an annular retaining wall 22, protruding upwardly from the housing inner floor 36. The wall 22 has an outer diameter equal to or slightly larger than the inner diameter of the spring 12.

A flexible housing floor 18 fits slidingly under the housing 10, being held in position by a catch tab (not shown) on the bottom of the housing 10 which mates with a key slot 26 in the floor 18. While flexibility of the floor 18 is not essential to the fundamental operation of the present invention, the flexible floor 18 provides several advantages. Its removability allows a quick interchange of springs; hence, springs having different elastic deformation properties can be used. In addition, its flexibility provides a pressure regulator type action with respect to the bladder 16 component of the mechanism. Alternatively, the housing 10 can have a fixed floor.

A spring and bladder holder 14 has a pair of outer, descending, guide projections 28, 28'. These projections 28, 28' are designed to fit slidingly in grooves 30, 30' in opposing inner walls of the housing 10. In general, the holder 14 has a circumferential shape which will allow it to slide unimpaired within the housing 10. The holder 14 has a central aperture 32 defined by annular surface 34. Annular surface 34 protrudes slightly beneath the bottom surface of the holder 14 and has an outer diameter equal to or slightly less than the inner diameter of the spring 12. Hence, when the holder 14 is inserted into the housing 10 with the projections 28, 28' engaging the housing grooves 30, 30', the annular wall 22 and the annular surface 34 protrusion capture the spring in a fixed alignment between the holder and the housing inner floor 36. The projections 28, 28' when inserted in the housing grooves 30, 30' maintain the holder 14 in approximately parallel relationship to the housing floor surface 24, holding the bladder 16 and spring 12 in a perpendicular relationship therebetween. Outwardly facing catch surfaces 38, 38' at the lower ends of the projections 28, 28' catch on lip surfaces 40, 40', respectively, in grooves 30, 30' to hold the spring 12, holder 14 and bladder 16 in place.

Note that the relative mating parts should be designed such that the lower end 42 of bladder 16 is minimally spaced from the upper surface 24 of the floor 18 or contacts the upper surface 24 of the floor 18 without any significant deformation. The bladder 16 has a central cavity 44 for containing air which will be used to apply a force on the ink reservoir. The upper end of the bladder 16 has a lip 46 which has a diameter greater than the inner diameter of aperture 32. The body 48 of the bladder 16 is narrower than said diameter. Hence, the bladder body can go down through the aperture 32 of the holder 14 and be held by a protruding integral ring 49. Ring 49 is positioned such that when bladder 16 is pulled through aperture 32, it will snap-fit the ring 49 under the lower ring 51 of holder 14. The bladder 16 thus sits surrounded by the subjacent spring 12.

While components 10, 12, 14, 16 and, optionally, 18 form a functional unit for priming an ink jet pen as will be described hereinafter, the inventors have found it advantageous to provide a mechanism for positioning the ink reservoir in a predetermined position relative to the force imparting mechanism in an integral unit. A housing lid 50 is adapted to perform this function.

Figure 3:
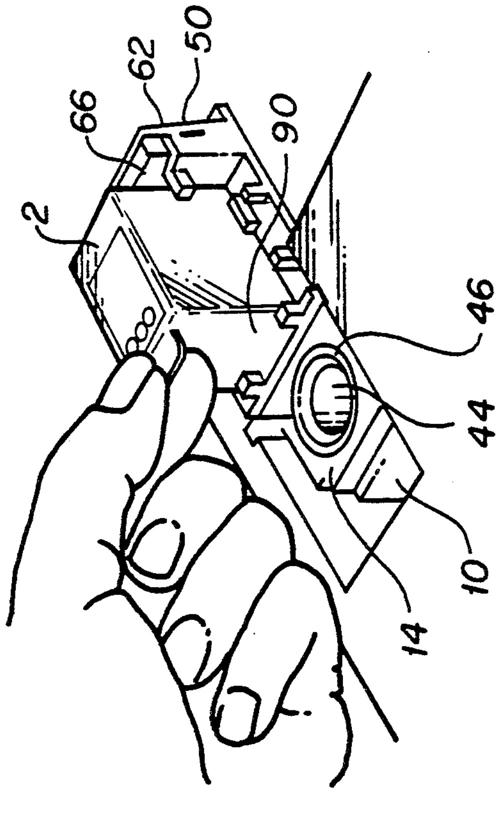
FIG. 3 is a perspective view of the pen as shown in FIG. 2 as being attached to the present invention as shown in FIG. 1.

As shown in FIGS. 1 and 3, the lid 50 has a set of inwardly (with respect to the housing chamber 20) facing pen cartridge holding tabs 52, 52' and inwardly facing pen cartridge alignment posts 54. As best seen in FIG. 3, the cartridge 2 should fit snugly into place within the region defined by said tabs 52, 52' and posts 54.

Referring back to FIG. 1, two hinging posts 56, 56', mounted or integrally molded into the lower end of the lid 50, couple the lid 50 to the housing 10. The posts 56, 56' extend beyond the edges 58, 58', respectively of the lower end of the lid 50 such that each can engage a primer housing groove, or cutout track, 60, 60' in the walls of the housing 10, adapted to guide movement of the lid 50 into and out of the housing cavity 20.

In an angular extension member 62 of the lid 50, a optional window 64 is provided. The window 64 is placed such that when the cartridge 2 is loaded into the lid 50 (as shown in FIG. 3), the printhead nozzle plate 8 is aligned with the window 50.

In the preferred embodiment, it was found desirable to provide a mechanism for removing any ink ejected by the orifice(s) during priming. An ink absorber pad holder 66, constructed of a transparent material, such as clear plastic, is adapted to hold an ink absorber pad 68 on the inner surface of angular member 62. Snap tabs 70, 70' on the sides of the holder 66 mate with apertures 72, 72', respectively, in the sides of the angular member 62 to keep the holder 66 and attached pad 68 in place. A window 74 in pad 68 aligns with the window 64 in angular member 62 of the lid 50.

In order to mitigate the need for replacing the absorber pad 68 as ink is ejected from the printhead orifices into the window 74 and absorbed by the pad 68 during priming, it is desirable to remove the ink from the pad 68. Thus, there is provided a chamois 80, having a wick 82. The wick 82 has an extremity region 84 having a cover 85 which lies in a groove 86 in the lid 50 so as to be in contact with the pad 68. By capillary action, the wick 82 draws the ink from the pad down to the chamois 80 which can lie, for example, in the bottom of the printer housing. In the preferred embodiment, except for the extremity region 84, the wick 82 is held in an ink-impervious sheath 88 to prevent leakage until the bottom section of chamois 80 is reached.

The operation of the present invention is illustrated in FIGS. 3 through 5*b*.

As shown in FIG. 3, the cartridge 2 is inserted into the lid 50 with the printhead 6 being adjacent to the window 74 of the absorber pad 68. Since in the present embodiment an air bladder 16 is used to provide a force on the ink reservoir in the cartridge 2, the wall 90 of the cartridge 2 should have at least one air inlet hole.

As will be readily recognized by a person skilled in the art, many simple variations of the force imparting mechanism can be used in conjunction with a pen cartridge 2 having a compressible reservoir; as examples, a mechanical plunger which pushes into the reservoir housing, a mechanical piston which compresses a wall of the reservoir housing, or an air injector would each work in an equivalent manner to the embodiment described. The basic concept is to apply a predetermined range of force (in this embodiment air pressure) on said reservoir at a position of said reservoir which is remote, and preferably distal, from the ink holding chamber between the printhead heater substrate and the printhead orifices in order to prime the pen.

Figure 4:
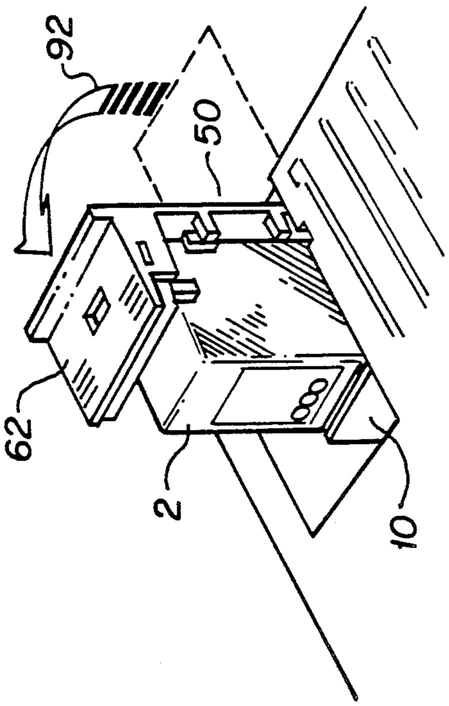
FIG. 4 is a perspective view of FIG. 3 with the pen having been moved into position where it is ready for priming.

Referring now to FIG. 4, the lid is rotated (as shown by the arrow labelled 92) on its hinging posts 56, 56' in the primer housing grooves 60, 60'. In this manner, the rear wall 90 of the cartridge 2 is brought into contact with the lip 46 of the bladder 16, effectively sealing the cavity 44 of the bladder 16 with the rear wall 90. The cartridge is now in the proper position for priming.

Figure 5B:
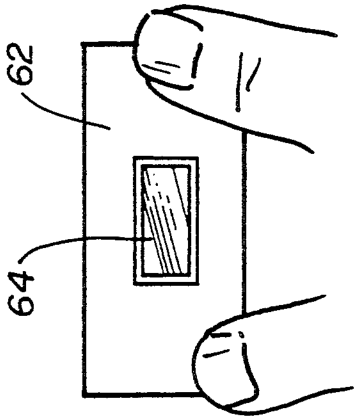
FIG. 5*b* is a plan view (top) of the view shown in FIG. 5*a* showing an alternative feature of the present invention as shown in FIG. 1.
Figure 5A:
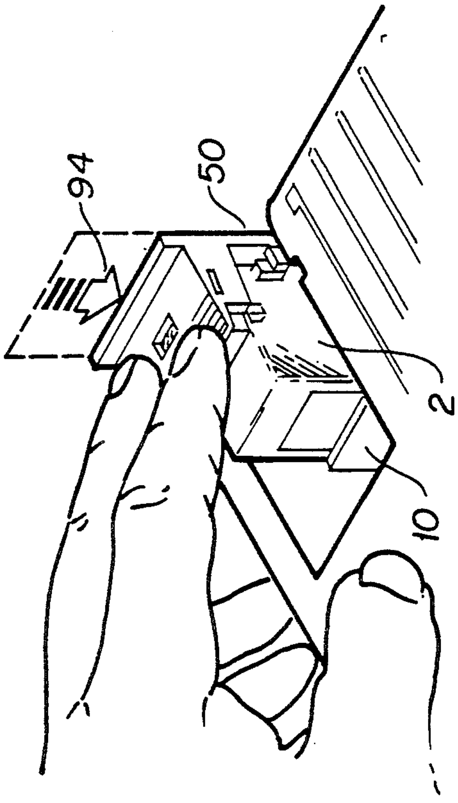
FIG. 5*a* is a perspective view of FIG. 4 with the pen being primed by being pushed into contact with the force imparting means of the present invention as shown in FIG. 1.

Referring to FIG. 5a, the lid 50 is pressed downward into the housing 10 central chamber 20 (as indicated by the arrow labelled 94) against the resistance of the spring 12. As the downward motion is begun, the bladder 16 will be forced by the housing floor surface 24 to collapse. The air trapped in bladder cavity 44 by the cartridge rear wall 90 will be forced through the hole in the cartridge wall 90. The force of the air will be imparted to the reservoir, in the present example constructed of foam, and the air pressure will cause the ink to flow from the reservoir to the printhead 6. Note, that the cartridge 2 could contain more than one foam reservoir, e.g. for a multicolor pen; the only requirement for adequate priming being, in such case, that the force be imparted to each foam pad.

As will be recognized by a person skilled in the art, the force applied to the reservoir(s) can be predetermined by calculating the sum of the effects of the specific bladder 16 size and compression factors together with the force imparted by the optional, flexible floor 18.

As shown in FIG. 5b, the user can observe the nozzle plate 8 through the window 64 of the lid 50, the clear absorber holder 66 and the window 74 in the absorber pad 68. The appearance of ink in the window 74 indicates that a flow has been established through the nozzle plate 8 and that the pen is primed. Hence, the cartridge 2 can be removed from the mechanism and inserted in its operating carriage for printing.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. Similarly, any method steps described might be interchangeable with other steps in order to achieve the same result. The embodiment was chosen and described in order to best explain the principles of the invention and its practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A method for priming an ink jet printhead having at least one encapsulated foam, ink reservoir, heating means for thermally exciting ink, nozzle means having a set of orifices for ejecting said excited ink, and ink holding chamber means between said heating means and orifices which is coupled to said reservoir, comprising:

applying air pressure to said foam at a position which causes ink to flow from said foam into said chamber such that said pressure is sufficient to eject said ink out of at least one said orifice.

2. The method as set forth in claim 1, wherein said step of applying a pressure comprises:

applying a predetermined range of pressure on said reservoir.

3. The method as set forth in claim 2, wherein said pressure is applied on said reservoir at a position of said reservoir which is distal from said ink holding chamber.

4. A mechanical priming apparatus for pre-priming an ink jet printhead which includes at least one ink-saturated, foam reservoir for supplying ink, ejecting means having at least one orifice for ejecting droplets of ink, agitating means for imparting excitation to said ink, and ink holding means, located approximately between said agitating means and said ejecting means and connected to said ink reservoir for transferring excited ink to said orifice, comprising:

a bladder for imparting an air pressure force on said ink reservoir foam; and means for coupling said ink reservoir to said bladder, such that said bladder can force air into said foam and ink from said foam to said holding means and from said orifice.

5. The apparatus as set forth in claim 4, further comprising:

means for positioning said supplying means in a predetermined position relative to said force imparting means.

6. The apparatus as set forth in claim 4, wherein said coupling means comprises:

an enclosing means for enclosing said foam reservoir such that said force can be imparted to said foam from said force imparting means such that ink will flow from said reservoir into said holding means and out said orifice.

7. The apparatus as set forth in claim 6, wherein said force imparting means comprises:

a bladder adapted to force air into said reservoir.

8. The apparatus as set forth in claim 7, wherein said enclosing means further comprises:

a housing means for maintaining said bladder in a substantially fixed position, having a movable bracketing means for holding said reservoir in said predetermined position, such that said reservoir can be pressed against said, bladder causing said bladder to be compressed.

9. The apparatus as set forth in claim 8, wherein said bracketing means further comprises:

a window means for observing said ejection of said ink from said orifice.

10. The apparatus as set forth in claim 9, wherein said apparatus further comprises:

means for wicking said ejected ink away from said window means.

11. A priming apparatus for a thermal ink jet printhead device having a foam ink reservoir, ejecting means having orifices for ejecting droplets of ink, heating means for imparting thermal excitation to said ink, and an ink holding chamber located approximately between said heating means and said ejecting means and coupled to said reservoir, comprising:

means for imparting a force on said foam;

means for holding and moving said reservoir in a set of predetermined positional relationships to said force imparting means; and means for coupling said force imparting means to said foam at a position distal from said coupling of said chamber and said reservoir, such that said force imparting means can supply a force to said foam when said holding and moving means moves said coupling means into one of said predetermined relational positions with respect to said force imparting means, whereby said force causes ink to flow from said reservoir to said chamber and out said orifices.

12. In combination with an ink jet pen having at least one ink-saturated, foam and at least one printhead having means for ejecting ink droplets, means for agitating ink, means, coupled to said reservoir, between said ejecting means and said agitating means, for holding ink, and means for enclosing said reservoir having said printhead mounted on one surface thereof and having means for allowing a force to be imparted on said reservoir foam at a position such that ink within said reservoir will move from said reservoir to said holding means; a priming device comprising:

means for imparting an air pressure force to said enclosing means and to said ink reservoir foam;

means for holding said ink jet pen in predetermined positional relationships to said air pressure force imparting means; and means for bringing said air pressure force imparting means into communication with said enclosing means such that said air pressure is imparted to said reservoir foam.

* * * * *

UNITED STATES PATENT AND TRADEMARK OFFICE

CERTIFICATE OF CORRECTION

PATENT NO. : 4,998,115
APPLICATION NO. : 07/248254
DATED : March 5, 1991
INVENTOR(S) : Ruben Nevarez et al.

It is certified that error appears in the above-identified patent and that said Letters Patent is hereby corrected as shown below:

Claim 12, Column 7, line 12, after "foam" insert --reservoir--

Signed and Sealed this

Twenty-first Day of October, 2008

JON W. DUDAS
*Director of the United States Patent and Trademark Office*